(12) United States Patent
Beavers

(10) Patent No.: US 6,366,671 B1
(45) Date of Patent: Apr. 2, 2002

(54) MULTIPLE OUTLET TELEPHONE JACK

(75) Inventor: Roger L. Beavers, Brown Summit, NC (US)

(73) Assignee: Abacon Telecommunications, LLC, Greensboro, NC (US)

( * ) Notice: Subject to any disclaimer, the term of this patent is extended or adjusted under 35 U.S.C. 154(b) by 0 days.

(21) Appl. No.: 09/260,475

(22) Filed: Mar. 1, 1999

(51) Int. Cl.[7] .......................... H04M 1/00; H01R 13/60
(52) U.S. Cl. ...................................... 379/438; 439/536
(58) Field of Search .................. 379/438; 439/638, 439/536, 365, 362, 364

(56) References Cited

U.S. PATENT DOCUMENTS

| | | | |
|---|---|---|---|
| 4,061,411 A | 12/1977 | Gumb et al. | 339/159 |
| 4,241,974 A | 12/1980 | Hardesty | 339/154 |
| 4,362,905 A | 12/1982 | Ismail | 179/1 |
| 4,846,708 A | 7/1989 | Marson et al. | 439/133 |
| 4,865,561 A | 9/1989 | Collier et al. | 439/391 |
| 4,911,646 A | 3/1990 | Marson et al. | 439/133 |
| 4,944,698 A | 7/1990 | Siemon et al. | 439/676 |
| 5,106,325 A | 4/1992 | Robinson et al. | 439/540 |
| 5,178,554 A | 1/1993 | Siemon et al. | 439/188 |
| 5,195,125 A | 3/1993 | Bliven et al. | 379/29 |
| 5,425,172 A | 6/1995 | Carswell et al. | 29/884 |
| 5,444,453 A | 8/1995 | Johnson et al. | 342/453 |
| 5,539,821 A * | 7/1996 | Blonder | 379/454 |
| 5,651,690 A | 7/1997 | Klas et al. | 439/352 |
| 5,666,408 A | 9/1997 | Lao | 379/442 |
| 5,697,815 A | 12/1997 | Drewnicki | 439/638 |

FOREIGN PATENT DOCUMENTS

| | | |
|---|---|---|
| WO | WO 91/15038 | 10/1991 |

OTHER PUBLICATIONS

Shiunn Yang Enterprise Co., Ltd.; information from the Internet; date unknown.
Photographs of Suttle Apparatus Corp. SE–625D; date unknown.
Shuttle Apparatus Corp., Surface Mount Jacks and Jack Assemblies, 1990, pp. 277–278.

* cited by examiner

Primary Examiner—Jack Chiang
(74) Attorney, Agent, or Firm—MacCord Mason PLLC (57) ABSTRACT

An apparatus provides multiple telephone jacks at an outlet box that has an installed telephone jack and holes to receive cover plate support screws. The apparatus includes a housing and a wiring board in the housing. The housing has an outlet box side and another side and generally has the shape of a rectangular parallelopiped with a minimal distance from the outlet box side to the other side to provide the appearance of a conventional outlet box coverplate with minimal protrusion into a room from the outlet box when installed. A telephone plug protrudes from the outlet box side of the housing to enable engagement with a jack mounted in the outlet box and includes a release lever to enable release of the plug from the jack. The housing has an access path to permit access to the release lever.

25 Claims, 5 Drawing Sheets

MULTIPLE OUTLET TELEPHONE JACK

BACKGROUND OF THE INVENTION

The present invention relates to improvements in wiring devices for telecommunications. In particular, the present invention provides a replacement for conventional faceplates or coverplates that are installed on telephone jack housings, in order to provide multiple jacks from a single, installed jack.

The RJ11 telephone connector jack has been around for decades, and many telephone installations have been made using that connector. Thus, there is a large installed base of telephone outlets in residences and businesses, and other installations for telephones, fax machines, and the like using such connectors.

In recent years, the number of telephone lines needed for typical daily operations has proliferated. In addition to the additional voice lines, lines for Internet connection, fax connection, and the like have become more and more desirable for both residential and business installations. The installed single outlet RJ11 connectors are not sufficient for these new needs. Various efforts have been made to address the need by providing after-market connectors enabling multiple telephone lines to be connected to a single outlet. Examples are shown in U.S. Pat. No. 5,697,815 to Drewnicki; U.S. Pat. No. 5,666,408 to Lao; U.S. Pat. No. 5,651,690 to Klas et al.; U.S. Pat. No. 5,425,172 to Carswell et al.; U.S. Pat. No. 4,865,561 to Collier et al.; U.S. Pat. No. 4,362,905 to Ismail; U.S. Pat. No. 4,241,974 to Hardesty; and U.S. Pat. No. 4,061,411 to Gumb et al.

While these connectors do provide for multiplication of outlets, they have the drawback of protruding into a room by a considerable amount, causing numerous problems. First, the protruding device is unsightly. Second, if a piece of furniture is to be located near the wall, the protruding portion requires the furniture to be kept a substantial distance away from the wall. Third, the protruding item, supported typically generally only by the interfitting of a male plug with a female jack, is subject to damage by a collision between something moving in the room and the protruding connector. Of course, the excessive protrusion makes such collisions more likely and it also enhances the leverage on the jack when the collision occurs, making damage more likely.

Further efforts have been made to provide multiple outlets including commercial products such as a jack Model SC-625D of Suttle Apparatus Corporation. However, such products have the drawback of being complicated and requiring rewiring of the outlet in order to be installed. A homeowner or non-technical person may be reluctant to undertake such a rewiring, and is subject to making an error or damaging the apparatus in making an attempt.

Accordingly, there is a need in the art for an easy to install multiplier for telephone jacks that does not require special expertise, is securely mounted to the wall, and does not protrude excessively into a room.

SUMMARY OF THE INVENTION

The present invention fulfills this need in the art by providing an apparatus for providing multiple telephone jacks at an outlet box that has an installed telephone jack and holes to receive cover plate support screws including a wiring board having mounted thereon a telephone plug and a plurality of telephone jacks and wires from the plug to the plurality of telephone jacks so that circuits are formed from the plug to the telephone jacks. A housing for the wiring board has an outlet box side and another side, with the wiring board arranged within the housing so that the number of telecommunications paths available from the outlet box side of the housing to the other side of the housing is multiplied. The housing has holes arranged to receive mounting screws to pass through the housing for engagement with the holes in the outlet box to form a secure mount of the housing on the outlet box.

In a preferred embodiment the housing includes a top having a coverplate and sidewalls and a bottom, and the wiring board is secured to the top. In this embodiment the bottom is secured to the sidewalls so that the top, bottom and sidewalls substantially surround all sides of the wiring board.

Typically the telephone plug includes a release lever, and the housing includes an access path from the other side through the housing to the release lever. Preferably, the wiring board has an opening for the access path. The access path may include a boundary wall affixed to the housing.

In a preferred embodiment the housing includes a top having a coverplate and sidewalls and a bottom. The wiring board is secured to the top with fasteners passing through the wiring board and lodged in the coverplate, and the bottom is secured to the sidewalls by an interlock fit so that the top, bottom and sidewalls substantially surround all sides of the wiring board. In this embodiment the coverplate preferably has an outlet box side and standoffs on its outlet box side positioned to hold the wiring board spaced away from a main portion of the top. The coverplate may also have bosses on its outlet box side surrounding the mounting holes to hold the bottom spaced away from the coverplate and away from the wiring board.

Preferably, the plug protrudes from the outlet box side of the housing to enable engagement with a jack mounted in an outlet box.

In a preferred embodiment the housing generally has the shape of a rectangular parallelopiped with a minimal distance from the outlet box side to the other side, to provide the appearance of a conventional outlet box coverplate with minimal protrusion into a room from the outlet box when installed.

The plurality of telephone jacks may be four telephone jacks. The wires from the plug to the jacks may connect all connected jacks to the same telecommunications path. Alternatively, the wires from the plug to the jacks may connect one of the connected jacks to a different telecommunications path than another jack.

The invention also provides a method of assembly of a telephone jack multiplier for an outlet box including affixing a plurality of telephone jacks and a telephone plug to a wiring board, connecting wires from the plug to the plurality of telephone jacks so that circuits are formed from the plug to the telephone jacks, installing the wiring board in a housing having an outlet box side and another side to form a plurality of telecommunication paths from the outlet box side of the housing to the other side of the housing, and providing mounting screws for the housing to pass through holes in the housing for engagement with the holes in the outlet box to form a secure mount of the housing on the outlet box.

The act of installing may include affixing the wiring board to a top that has a coverplate and sidewalls. It may also include affixing a bottom to the wiring board after the wiring board is affixed to the top so that the top, bottom and sidewalls substantially surround all sides of the wiring board.

The act of installing may include aligning a release lever on the telephone plug with an access path from the other side through the housing to the release lever. It may also include aligning a boundary wall for the access path affixed to the housing with the release lever.

Installing may also include securing the wiring board to a coverplate of the housing by passing fasteners through the wiring board and lodging the fasteners in the coverplate. It may also include interlocking portions of a bottom to sidewalls attached to the coverplate so that the coverplate, bottom and sidewalls substantially surround all sides of the wiring board.

The act of wiring the plug to the jacks may include connecting all connected jacks to the same telecommunications path. Alternatively it may include connecting one of the connected jacks to a different telecommunications path than another jack.

The invention also provides a method of installation of a multiple telephone jack apparatus on an outlet box in a surface including removing a coverplate from the outlet box to expose an opening in the surface and an installed jack and mounting holes on the outlet box, positioning a multiple telephone jack apparatus on the opening in the surface while inserting a plug that extends from the apparatus into the installed jack; and passing screws through the multiple telephone jack apparatus and into the mounting holes on the outlet box to secure the multiple telephone jack apparatus onto the outlet box.

The invention further provides a method of removal of a multiple telephone jack apparatus from an outlet box in a surface including unscrewing screws that pass through the multiple telephone jack apparatus and into the mounting holes on the outlet box to loosen the multiple telephone jack apparatus from the outlet box, inserting an elongated item into an access path opening in a surface of the multiple telephone jack apparatus to deflect a release lever on a plug extending from the multiple telephone jack apparatus into a jack in the outlet box to release the plug from the jack in the outlet box, and moving the multiple telephone jack apparatus away from an outlet box.

The invention further provides a method of installation of a multiple telephone jack apparatus on an outlet box in a surface including removing screws; holding a coverplate to the outlet box that has a single installed jack to expose screw mounting holes in the coverplate on the outlet box; positioning a multiple telephone jack apparatus on the coverplate while inserting a plug that extends from the apparatus into the installed jack; and passing long screws through the multiple telephone jack apparatus and into the mounting holes on the outlet box to secure the multiple telephone jack apparatus onto the outlet box.

BRIEF DESCRIPTION OF THE DRAWINGS

The invention will be better understood by a reading of the Detailed Description of the Preferred Embodiments along with a review of the drawings, in which.

DETAILED DESCRIPTION OF THE PREFERRED EMBODIMENT

Figure 1:
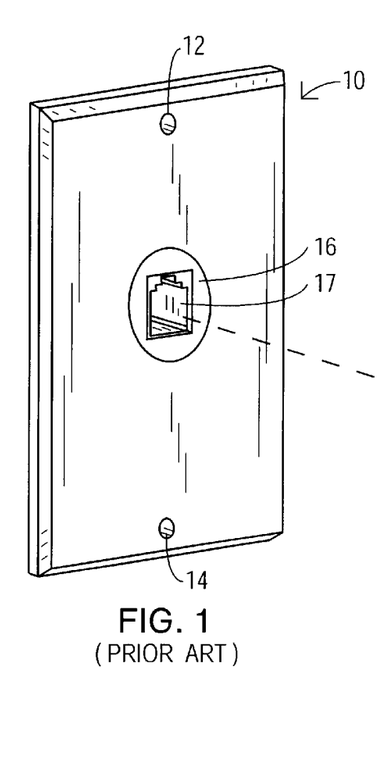
FIG. 1 is a perspective view of a prior art coverplate for a telephone jack mounted in an outlet box.

As seen in FIG. 1, a conventional coverplate 10 for wall mounted telephone jacks has upper and lower holes 12 and 14 into which screws fit to be received by mating holes on an outlet box (not shown). These screws hold the plate 10 in place. A hole 16 in the middle of the plate 10 allows a telephone jack 17 mounted in the outlet box to be accessed for insertion and removal of telephone jacks such as RJ11 plugs.

Figure 2:
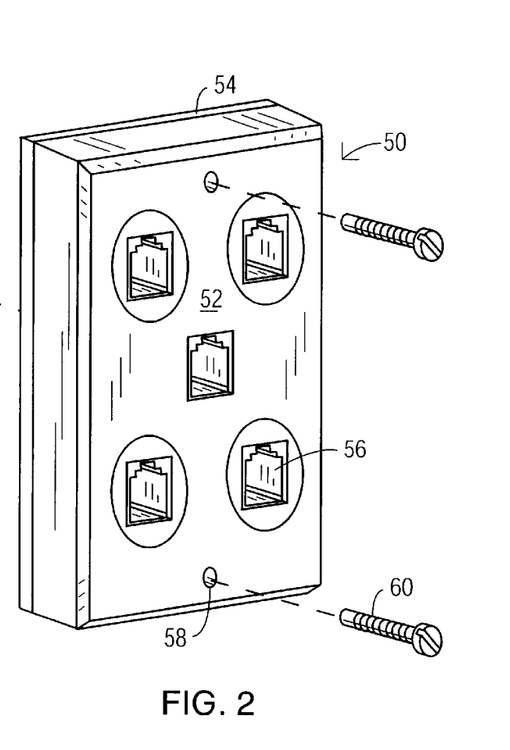
FIG. 2 is a perspective view of a preferred embodiment of a multiple outlet telephone jack according to the invention.

As seen in FIG. 2, the preferred embodiment of the present invention provides a multiple outlet telephone jack apparatus 50 having a housing made up of a top 52 and a bottom 54. The housing has upper and lower holes 58 adapted to allow screws 60 to pass through the entire apparatus 50 for engagement with the mounting holes in the installed outlet box. In the embodiment depicted in FIG. 2, the conventional coverplate 10 is removed from the outlet and the apparatus 50 is installed in its place. So installed, the multiple outlet telephone jack apparatus 50 has four independently accessible telephone jacks 56 available to receive various plugs, as desired.

Figures 4A, 4B, 4C:
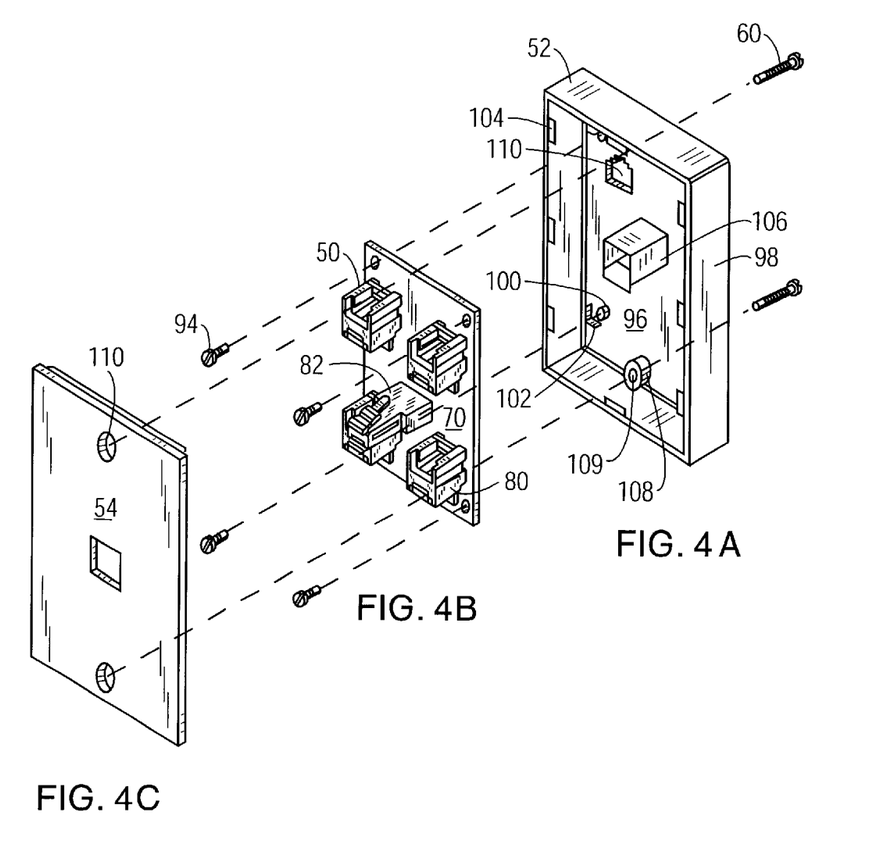
FIGS. 4A–4C are rear perspective views of the components to be assembled together to make a multiple outlet telephone jack according to the embodiment of FIG. 2.

FIGS. 4A–4C show the apparatus 50 in an exploded, rear perspective view with the top 52 separated from the bottom 54, showing the normally internally located wiring board 70.

Figure 3A:
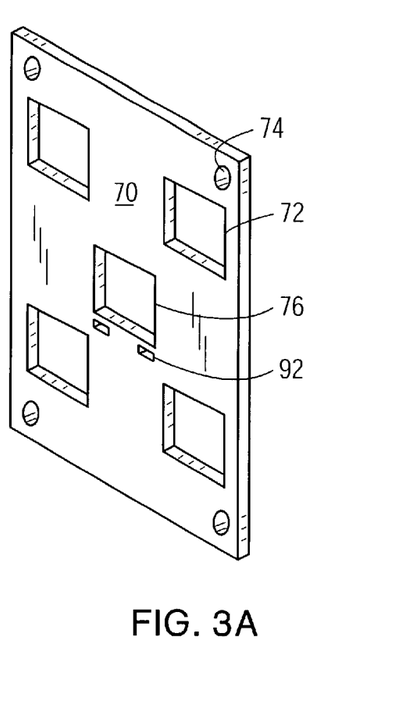
FIGS. 3A–3C are perspective views of the components to be assembled together to make a wiring board assembly according to the embodiment of FIG. 2.

The wiring board 70 as seen in FIG. 3A may be formed of a stamped metal or other suitable material. It has four peripheral windows 72 arranged about a central window 76. The peripheral windows 72 are sized to receive leading ends of jacks 80, seen in FIG. 3B. Just below the central window 76 of the wiring board 70, two holes 92 are provided to receive a 6P plug 82 seen in FIG. 3C. The holes 74 are sized to receive rivets or other suitable apparatus or the like for engaging the wiring board 70 with the top 52. Other ways of affixing the board 70 to the top 52 may be substituted, such as adhesives, press fit or interlock fits.

Figures 3B, 3C:
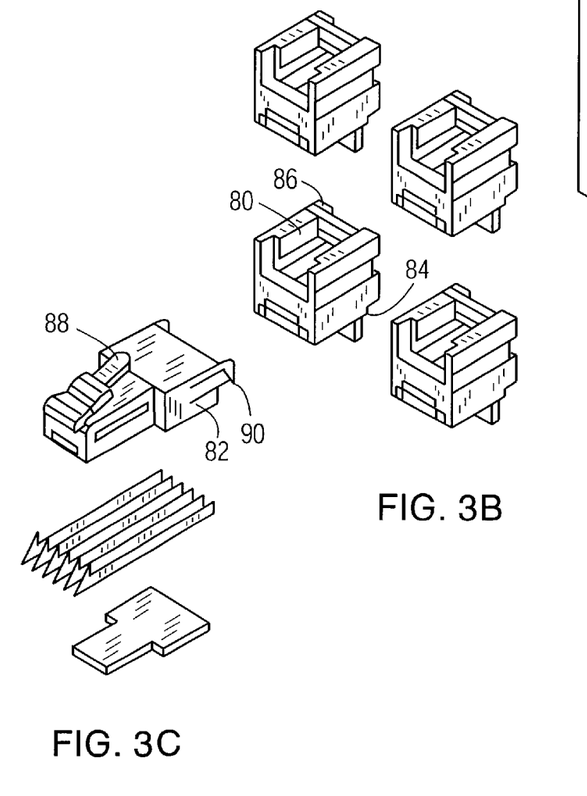

As seen in FIG. 3B, the jacks 80 are provided with peripheral shoulders 84 and 86, so that the part forwardly of the shoulder 84 can pass into the window 72 with the shoulders 84 and 86 being held rearwardly of wiring board 70.

The 6P plug 82 shown in FIG. 3C is arranged for secure attachment to a jack in a wall-mounted outlet, such as jack 16 of FIG. 1. The plug 82 has a release lever 88 for release of the plug 82 from the jack by depression of the release lever 88. Levers of this sort are conventional in telephone jacks. The plug 82 is provided with prongs 90 to engage holes 92 in the board 70.

As seen in FIG. 4, the wiring board 70 has the jacks 80 engaged in the respective windows 72 with upper and lower shoulders 86 and 84 engaging on the rearward face of the mounting board 70. Similarly, forward prongs 90 of the plug 82 engage with openings 92 in wiring board 70. The engagement of the prongs 90 of the plug 82 with the holes 92 of wiring board 70 causes the plug 82 to be located below the window 76. This permits the window 76 to serve as an accessway for actuation of the lever 88. The jacks and plugs are mounted onto the wiring board 70 and are wired in a factory environment in any desired wiring pattern.

For example, all four of the jacks can be connected with identical wiring to the wires of the plugs so that they form four identical parallel wire connections. Alternatively, since telephone wires are usually provided with two distinct pair of wires, either pair of which is sufficient to transmit and receive, one pair could be wired to one or more of the jacks 80 and the other pair wired to the remainder.

The assembled jacks and plug on the wiring board 70 are thus ready for mounting with screws 94 into the top 52.

The top 52, as seen in FIG. 4A, includes a coverplate portion 96 and side walls 98. Thus, when the top 52 is assembled with the bottom 54, the result is a shape that is generally a rectangular parallelepiped. It is generally desirable, however, that the side walls 98 be maintained as short as possible to minimize the distance between the bottom 54 and the coverplate 96, and therefore minimize the amount that the entire apparatus will protrude into a room once installed.

Internally, top 52 is provided with standoffs 102 and threaded holes 100 to receive the screws 94. The standoffs assure that the appropriate spacing between wiring board 70 and the coverplate 96 is maintained for the proper location of the fronts of the plugs 56 at the side of the top 52 (not visible in FIG. 4A).

Figure 5A:
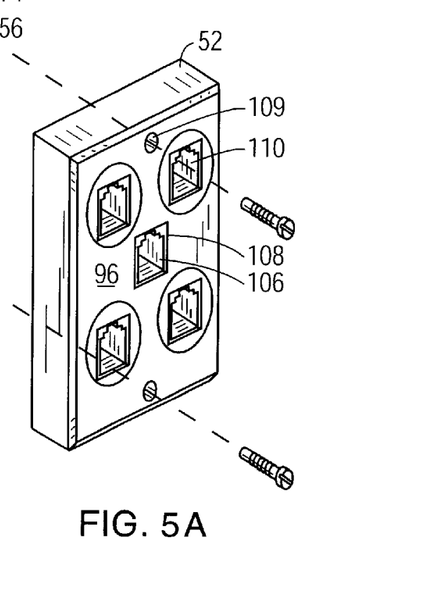
FIGS. 5A–5C are front perspective views of the components to be assembled together to make a multiple outlet telephone jack according to the embodiment of FIG. 2.
Figure 5B:
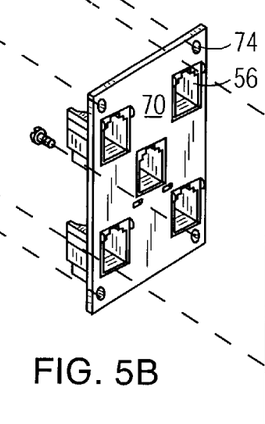
Figure 5C:
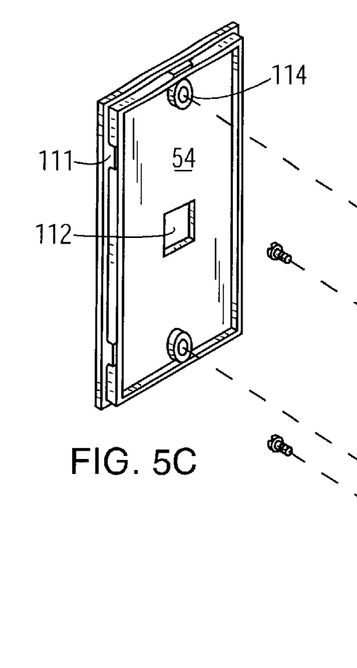

The side walls 98 are provided with tabs 104 positioned to interlock with notches 111 on bottom 54 (seen in FIG. 5C).

The top 52 is further provided with a rearwardly extending channel 106 positioned for alignment with the window 76 of the wiring board 70. Thus, the channel 106 provides a boundary around an access path for the lever 88 in the assembled apparatus.

The coverplate 96 is further provided with rearwardly extending bosses 108 having central holes 109 positioned for alignment to pass above and below the wiring board 70 and in alignment with the holes 110 in the bottom 54. These holes are spaced so that they will align with the mounting holes in the outlet box into which the assembled apparatus is to be installed.

As can be seen in FIG. 5A, coverplate 96 of the top 52 has the four openings 110 aligned with the jacks 56 mounted in the wiring board 70. When the screws 94 engage the wiring board 70 with threaded bosses 100, the jacks 56 thus are available for access through the openings 110 in the front of the top 52. The channel 106 terminates in an opening 108, so that access can be had to the lever 88. The holes 109 in the center of bosses 108 are also visible.

As seen in FIG. 5C, the bottom 54 has notches 111 around its periphery located so that the tabs 104 will interlock with the notches 111 to hold the bottom 54 secured to the top 52. A window 112 in the bottom 54 is positioned for alignment to receive plug 82, so that the plug 82 can be engaged with a jack mounted in a wall-mounted outlet. The bottom 54 is also provided with bosses 114 which cooperate with the bosses 108 on the rear of the coverplate 96. The bosses 114 and 108 define a passageway for the screws 60 for engagement with the mounting holes of the outlet box installed in the wall to which the apparatus is to be mounted.

Thus, when the wiring board 74 is affixed to the top 52, and the bottom 54 is engaged by having the notches 111 receive the tabs 104, a generally unitary structure is provided. This unitary structure can then be sold as a commercial unit to a consumer who has no need for disassembly of the apparatus for installation or normal use.

The user can then provide him/herself with a multiplicity of outlet jacks by removing conventional coverplate 10 from an outlet; aligning the assembled apparatus 50 so that the plug 82 aligns with and inserts into the jack 17; and securing the unitary structure to the wall using screws 60.

If, for some reason, the user wishes to dismount the apparatus, he or she need merely unscrew the screws 60 and insert a narrow instrument through the channel 106 to depress the lever 88, to disengage the apparatus from the outlet box.

Figure 6:
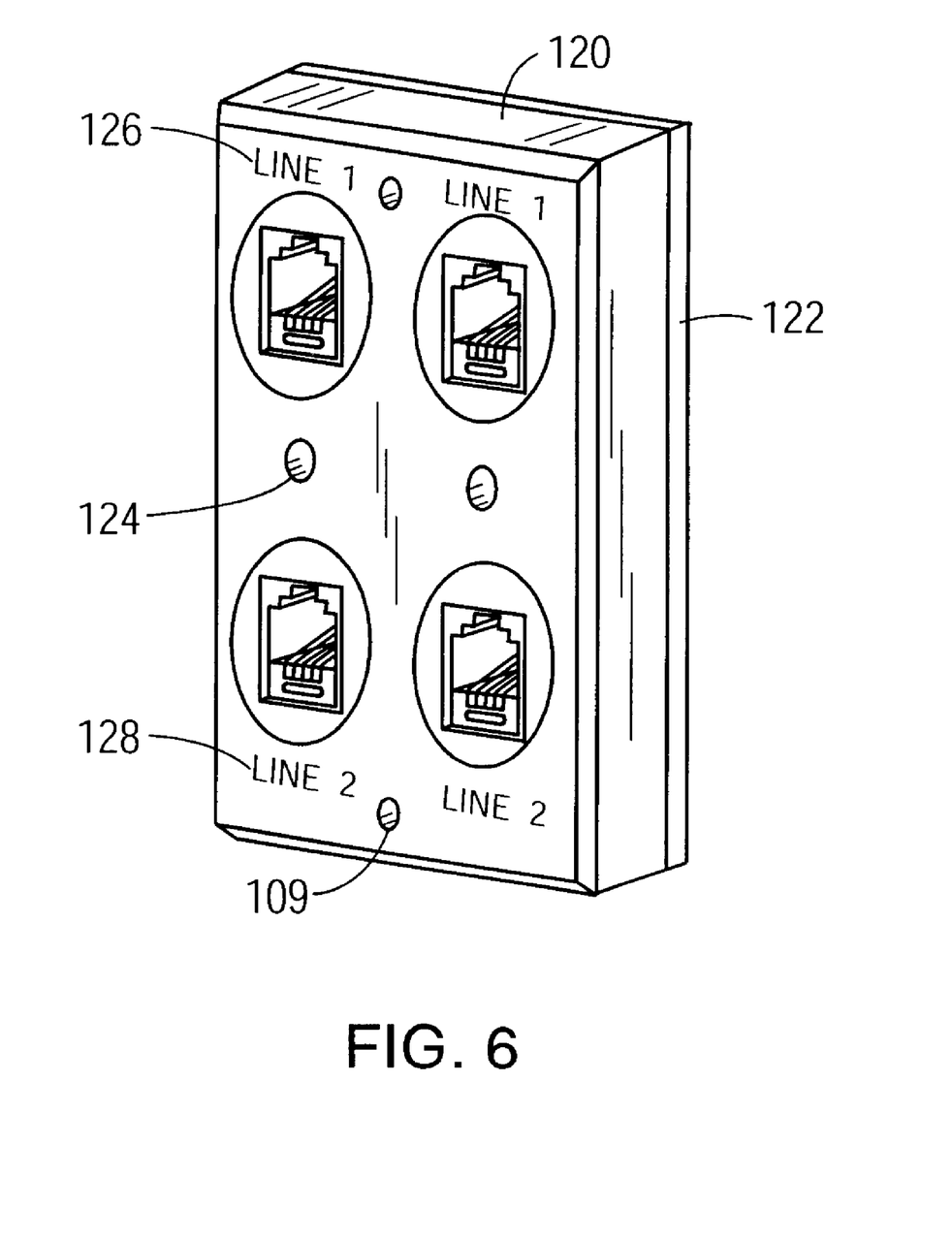
FIG. 6 is a front perspective view of an alternative embodiment for a top showing three optional refinements.

FIG. 6 shows an embodiment of a top 120 similar in all respects to the top 52 described previously, except that it has several refinements, which can be made to the apparatus either singly or as combinations. First, side holes 124 can be provided in addition to (or instead of) the holes 109 for use with outlet boxes that have similarly-located holes. Of course, corresponding refinements of the wiring board and bottom to accommodate the side holes would also be needed. Second, the side walls 122 of the top 120 can be made slightly deeper, on the order of 2–3 mm deeper, so that the entire apparatus can fit over top of the original coverplate 10 (see FIG. 1). Thus, when installing the apparatus, the screws 12, 14 holding the coverplate 10 would be removed, but not the coverplate 10 itself. The multiple jack apparatus will fit over the old coverplate, and the plug 82 will be properly positioned to engage the original jack. This adds to the security of the fit and reduces the complexity of the installation process. Third, the top 120 can be provided with legends 126, 128 identifying the jack as being either line 1 or line 2. Of course, the wiring of the plug 82 to the jack needs to be coordinated with this labeling.

Those of ordinary skill in the art will appreciate that other variations of design can be made without departing from the spirit or scope of the invention.

While it is impossible to list all such variations, several examples will be given. For example, the number of jacks 56 need not be four. Other numbers of jacks can be provided, along with appropriate changes in the numbers of the windows 72 and openings in the coverplate 96. Of course, the top 52 can have other shapes besides rectangular, but does need to have the holes aligned for receiving screws and a mount for the plug 82 to align with the installed jack in the outlet box to be replicated. Various other ways of affixing replicated jacks to the plug 82 can be used other than the specific expedient of the wiring board 70, although it does provide a low profile, which is preferable. Wiring board 70 can be affixed to the coverplate 96 by means other than screws, as will be apparent to those of ordinary skill in the art. Also, the bottom 54 can be affixed to the top 52 other than by the inter-engagement of tabs and notches, as will be apparent to those of ordinary skill in the art.

As will be apparent, the present invention provides a convenient way to replicate telephone jacks through a multiple apparatus which can be securely mounted to an outlet box and provide a minimum protrusion into a room from the outlet box. This provides the advantage of avoidance of collisions, as well as provides a more secure engagement and reduced lever arm, to be able to withstand collisions. In addition, the non-electrician can readily install the device without resort to wiring or other activities which may require specialized knowledge or especially agile manipulations.

What is claimed is:

1. An apparatus for providing multiple telephone jacks at an outlet box that has an installed telephone jack and holes to receive cover plate support screws comprising:

a wiring board having mounted thereon a telephone plug and a plurality of telephone jacks and wires from said plug to said plurality of telephone jacks so that circuits are formed from said plug to said telephone jacks; and a housing for said wiring board said housing having an outlet box side and another side with said wiring board arranged within said housing so that the number of telecommunications paths available from said outlet box side of said housing to said other side of said housing is multiplied, and said housing having holes arranged to receive mounting screws to pass through the housing for engagement with the holes in the outlet box to form a secure mount of the housing on the outlet box;

wherein said telephone plug includes a release lever and said housing includes a channel through a central portion thereof to provide an access path from the other side though the housing to the release lever.

2. An apparatus as claimed in claim 1 wherein said housing includes a top having a coverplate and sidewalls and a bottom.

3. An apparatus as claimed in claim 2 wherein said wiring board is secured to said top.

4. An apparatus as claimed in claim 2 wherein said wiring board is secured to said top and said bottom is secured to said sidewalls so that said top, bottom and sidewalls substantially surround all sides of said wiring board.

5. An apparatus as claimed in claim 1 wherein said wiring board has an opening for said access path.

6. An apparatus as claimed in claim 1 wherein said access path has a boundary wall affixed to said housing.

7. An apparatus as claimed in claim 1 wherein said housing includes a top having a coverplate and sidewalls and a bottom and said wiring board is secured to said top with fasteners passing through said wiring board and lodged in said coverplate and said bottom is secured to said sidewalls by an interlock fit so that said top, bottom and sidewalls substantially surround all sides of said wiring board.

8. An apparatus as claimed in claim 7 wherein said coverplate has an outlet box side and standoffs on its outlet box side positioned to hold said wiring board spaced away said coverplate.

9. An apparatus as claimed in claim 7 wherein said coverplate has an outlet box side and bosses on its outlet box side surrounding said mounting holes to hold said bottom spaced away from said coverplate and away from said wiring board.

10. An apparatus as claimed in claim 1 wherein said plug protrudes from said outlet box side of said housing to enable engagement with a jack mounted in an outlet box.

11. An apparatus as claimed in claim 1 wherein said housing generally has the shape of a rectangular parallelopiped with a minimal distance from the outlet box side to said other side, to provide the appearance of a conventional outlet box coverplate with minimal protrusion into a room from the outlet box when installed.

12. An apparatus as claimed in claim 1 wherein said plurality of telephone jacks is four telephone jacks.

13. An apparatus as claimed in claim 1 wherein said wires from said plug to said jacks connect all connected jacks to the same telecommunications path.

14. An apparatus as claimed in claim 1 wherein said wires from said plug to said jacks connect one of the connected jacks to a different telecommunications path than another jack.

15. A method of assembly of a telephone jack multiplier for an outlet box comprising:

affixing a plurality of telephone jacks and a telephone plug to a wiring board;

connecting wires from the plug to the plurality of telephone jacks so that circuits are formed from the plug to the telephone jacks;

installing the wiring board in a housing having an outlet box side and another side to form a plurality of telecommunications paths from the outlet box side of the housing to tie other side of the housing;

aligning a release lever on the telephone plug with a channel through a central portion of the housing to provide an access pat from e other side through the housing to the release lever, and providing mounting screws for the housing to pass through holes in the housing for engagement with the holes in the outlet box to form a secure mount of the housing on the outlet box.

16. A method as claimed in claim 15 wherein installing includes affixing the wiring board to a top that has a coverplate and sidewalls.

17. A method as claimed in claim 16 wherein installing also includes affixing a bottom to the wiring board after the wiring board is affixed to the top so that the top, bottom and sidewalls substantially surround all sides of the wiring board.

18. A method as claimed in claim 15 wherein installing includes aligning a boundary wall for the access path affixed to the housing with the release lever.

19. A method as claimed in claim 15, wherein installing includes securing the wiring board to a coverplate of the housing by passing fasteners through the wiring board and lodging the fasteners in the coverplate.

20. A method as claimed in claim 19 wherein installing includes interlocking portions of a bottom to sidewalls attached to the coverplate so that the coverplate, bottom and sidewalls substantially surround all sides of the wiring board.

21. A method as claimed in claim 15 wherein wiring the plug to the jacks includes connecting all connected jacks to the same telecommunications path.

22. A method as claimed in claim 15 wiring the plug to the jacks includes connecting one of the connected jacks to a different telecommunications path than another jack.

23. A method of assembly of a multiple telephone jack apparatus for an outlet box comprising:

affixing a plurality of telephone jacks and a telephone plug having a release lever to a wiring board;

connecting wires from the plug to the plurality of telephone jacks so that circuits are formed from the plug to the telephone jacks; and installing the wiring board in a housing having an outlet box side and another side to form a plurality of telecommunications paths from the outlet box side of the housing to the other side of the housing including affixing the wiring board to a top for the housing that has a coverplate and sidewalls including aligning the release lever on the telephone plug with a boundary wall of an access path through the housing affixed to the top and securing the wiring board to the coverplate by passing fasteners through the wiring board and lodging the fasteners in the top, and affixing a bottom for the housing by interlocking portions of the bottom to sidewalls of the top after the wiring board is affixed to the top so that the top, bottom and sidewalls substantially surround all sides of the wiring board; and providing mounting screws for the housing to pass through holes in the housing for engagement with the holes in the outlet box to form a secure mount of the housing on the outlet box.

24. A method of installation of a multiple telephone jack apparatus on a telephone jack outlet box in a surface comprising:

removing a coverplate from the telephone jack outlet box to expose an opening in the surface and an installed telephone jack and mounting holes on the telephone jack outlet box, positioning a multiple telephone jack apparatus on the opening in the surface while inserting a plug that extends from a channel through a central portion of the multiple telephone jack apparatus into the installed telephone jack; and passing screws through the multiple telephone jack apparatus and into the mounting holes on the telephone jack outlet box to secure the multiple telephone jack apparatus onto the telephone jack outlet box.

25. A method of removal of a multiple telephone jack apparatus from an outlet box in a surface comprising:

unscrewing screws that pass through the multiple telephone jack apparatus and into the mounting holes on the outlet box to loosen the multiple telephone jack apparatus from the outlet box, inserting an elongated item into a channel through a central portion of the multiple telephone jack apparatus to thereby access a path to deflect a release lever on a plug extending from the multiple telephone jack apparatus into a jack in the outlet box to release the plug from the jack in the outlet box, and moving the multiple telephone jack apparatus away from an outlet box.

* * * * *

UNITED STATES PATENT AND TRADEMARK OFFICE
CERTIFICATE OF CORRECTION

PATENT NO. : 6,366,671 B1
DATED : April 2, 2002
INVENTOR(S) : Roger L. Beavers

It is certified that error appears in the above-identified patent and that said Letters Patent is hereby corrected as shown below:

<u>Column 8,</u>
Line 7, after the word access, "pat from e" should be -- path from the --.

Signed and Sealed this

Twenty-eighth Day of May, 2002

*Attest:*

*Attesting Officer*

JAMES E. ROGAN
*Director of the United States Patent and Trademark Office*